(12) United States Patent
Qian et al.

(10) Patent No.: US 8,981,003 B2
(45) Date of Patent: *Mar. 17, 2015

(54) BIORENEWABLE COPOLYESTER THERMOPLASTIC ELASTOMERS

(75) Inventors: Guoqiang Qian, Buffalo Grove, IL (US); Krishna Venkataswamy, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/634,268

(22) PCT Filed: Mar. 16, 2011

(86) PCT No.: PCT/US2011/028725
§ 371 (c)(1),
(2), (4) Date: Sep. 12, 2012

(87) PCT Pub. No.: WO2011/116130
PCT Pub. Date: Sep. 22, 2011

(65) Prior Publication Data
US 2013/0005901 A1    Jan. 3, 2013

Related U.S. Application Data

(60) Provisional application No. 61/314,973, filed on Mar. 17, 2010.

(51) Int. Cl.
| C08G 18/42 | (2006.01) |
| C08L 67/02 | (2006.01) |
| C08L 91/00 | (2006.01) |
| C08L 91/02 | (2006.01) |

(52) U.S. Cl.
CPC .............. *C08L 67/025* (2013.01); *C08L 91/00* (2013.01); *C08L 91/02* (2013.01)
USPC ............ 524/604; 426/573; 426/601; 525/418

(58) Field of Classification Search
None
See application file for complete search history.

(56) References Cited

U.S. PATENT DOCUMENTS

| 4,374,225 | A | 2/1983 | Kawakubo et al. |
| 5,543,489 | A * | 8/1996 | Alex et al. ..................... 528/288 |
| 5,922,832 | A | 7/1999 | Randall et al. |
| 6,361,730 | B1 | 3/2002 | Alex et al. |
| 7,196,124 | B2 * | 3/2007 | Parker et al. .................. 523/457 |
| 7,718,740 | B2 | 5/2010 | Malet et al. |
| 7,968,655 | B2 | 6/2011 | Malet |
| 2006/0121170 | A1 * | 6/2006 | Howard ......................... 426/573 |
| 2007/0270239 | A1 | 11/2007 | Sullivan et al. |
| 2009/0176924 | A1 | 7/2009 | Bordere et al. |
| 2010/0227967 | A1 | 9/2010 | Page et al. |
| 2011/0306711 | A1 * | 12/2011 | Qian et al. .................... 524/114 |

FOREIGN PATENT DOCUMENTS

| JP | 20000344403 | 2/2000 |
| JP | 2001192553 | 7/2001 |

OTHER PUBLICATIONS

Espacenet for JP2000034403.
Espacenet for JP2001192553.

* cited by examiner

*Primary Examiner* — Susannah Chung
*Assistant Examiner* — Robert T Butcher
(74) *Attorney, Agent, or Firm* — John H. Hornickel; Michael J. Sambrook

(57) ABSTRACT

A thermoplastic elastomer compound is disclosed having copolyester elastomer, epoxidized soybean oil, and vulcanized vegetable oil. The compound has a biorenewable content of at least about 50 weight percent of the compound. The compound can be used to make a plastic article needing a Shore A hardness of from about 40 to about 70. The compound is a sustainable solution for extruded or molded articles.

12 Claims, No Drawings

BIORENEWABLE COPOLYESTER THERMOPLASTIC ELASTOMERS

CLAIM OF PRIORITY

This application claims priority from U.S. Provisional Patent Application Ser. No. 61/314,973 and filed on Mar. 17, 2010, which is incorporated by reference.

FIELD OF THE INVENTION

This invention relates to thermoplastic elastomers, polymer compounds which exhibit elasticity while remaining thermoplastic, which are predominantly made of biorenewable materials.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of the later $20^{th}$ Century.

Thermoplastic elastomers (TPEs) combine the benefits of elastomeric properties of thermoset polymers, such as vulcanized rubber, with the processing properties of thermoplastic polymers.

Thermoplastic elastomers presently are prepared from fossil-fuel derived polymer resins, such as styrene block copolymers (SBCs), thermoplastic vulcanizates (TPV), thermoplastic olefins (TPO), copolyesters (COPE), thermoplastic urethanes (TPU), copolyamide (COPA), and most recently olefin block copolymers (OBCs).

SUMMARY OF THE INVENTION

The art needs a TPE made from biorenewable materials. However, it is not straightforward to find appropriate biorenewable materials that can be combined to form a biorenewable TPE which functions physically in a comparable manner to a fossil-fuel derived TPE.

The present invention has found a unique combination of three different biorenewable materials can form a biorenewable TPE which has commercially acceptable physical performance properties.

More specifically, beginning with a polyester copolymer ("copolyester" or COPE), one can prepare a biorenewable TPE which can have a hardness ranging from about 42 to about 70 on the Shore A hardness scale.

This biorenewable TPE is achieved by combining an epoxidized soybean oil (ESO) and a vulcanized vegetable oil (VVO) with the COPE.

Significantly, it has been found that both types of oil are required. A combination of only epoxidized soybean oil with COPE yields a totally unacceptable oil-bleeding TPE. A combination of only vulcanized vegetable oil with COPE yields a totally unacceptable very hard TPE well above the desired Shore A hardness range described above.

Unexpectedly, it has been found that the vulcanized vegetable oil, though a solid powder, contributes to the stability of the biorenewable TPE, minimizing bleeding of epoxidized soybean oil from the TPE while also not making the TPE too hard for commercially acceptable uses. The solid VVO literally stops the ESO bleeding from the COPE without blocking the performance of the ESO to reduce the hardness of the COPE.

The present invention solves the problem of finding a commercially practical biorenewable TPE which can be used in replacement of a conventional TPE prepared from ingredients, particularly polymers, which are derived synthetically from fossil fuels such as petroleum or natural gas.

One aspect of the invention is a thermoplastic elastomer compound, comprising (a) from about 10 to about 80 weight percent of a copolyester elastomer; (b) from about 5 to about 40 weight percent of epoxidized soybean oil; and (c) from about 10 to about 60 weight percent of a vulcanized vegetable oil, wherein the biorenewable content of the compound is at least about 60 weight percent.

"Biorenewable content" for this invention means that the source of the ingredient is a current naturally occurring substance. As such, the biorenewable TPE of the present invention is a compound contributing to the sustainability of natural resources available on earth, rather than derived from within the earth. Desirably, the biorenewable content exceeds 50%. Preferably, the biorenewable content can exceed 65%.

The epoxidized soybean oil and the vulcanized vegetable oil are both fully biorenewable. The soft polyol segment of the DuPont Hytrel® RS COPE is biorenewable derived from corn.

Another aspect of the invention is a plastic article molded or extruded from the biorenewable TPE of the present invention.

Features of the invention will become apparent with reference to the following embodiments.

EMBODIMENTS OF THE INVENTION

Copolyester

The copolyester useful in the present invention is a copolyester elastomer containing 50% content by percent weight of biorenewable sources.

DuPont sells branded Hytrel, a copolyester elastomer. Of the several grades available of the Hytrel RS COPE, 4069, RS40F3, RS40F5 can be used. Also, they could be compatible to greater or lesser degrees with both epoxidized soybean oil and vulcanized vegetable oil.

The various preferred grades of Hytrel RS COPE have melting points ranging from 188° C.-192° C., Hardness of 35 Shore D after 1 second and 32 Shore D after 15 seconds, Stresses at Break of 522-682 MPa, Strains at Break ISO 527 (5 A bar @ 50 mm/min) and Tensile Moduli of 40-42 MPa.

The COPE alone is too hard for commercial acceptance, especially in substitution of a conventional TPE made from a fossil-fuel polymer resin. It needs to be softened.

Epoxidized Soybean Oil

Any epoxidized soybean oil (CAS No. 8013-07-8) is a candidate for use in the present invention. The ESO is used to provide plasticization of the COPE, making it less hard and suitable for use as a TPE with a hardness of commercial acceptance.

Commercially available ESOs include several Paraplex brand epoxidized soybean oil grades from Hallstar. Of the available grades, Paraplex G-62 ESO is presently preferred because of its high molecular weight, low acid value, low color and low iodine number. It also has good compatibility with polar polymers. It is a viscous light yellow liquid with a mild odor.

The addition of ESO to COPE has been found to reduce the Shore A hardness to a commercially acceptable range. However, the ESO can not be contained in the resulting extruded pellets or molded articles, and results in totally unacceptable bleeding of oil, also known as blooming without the addition of VVO, a commercially acceptable biorenewable COPE-ESO TPE.

Vulcanized Vegetable Oil

Any vulcanized vegetable oil is a candidate for use in the present invention. The VVO has been found to be unexpectedly vital to stabilize the ESO in the COPE to minimize oil bleeding but does not adversely affect other physical properties of the TPE such as Shore A hardness.

Commercially available VVOs include several Akrofax brand vulcanized vegetable oil grades from Akrochem. Of the available grades, Akrofax 758 VVO is presently preferred because it is sulfurless and provides good color stability during compounding.

Akrofax 758 is an oil resistant grade vulcanized vegetable oil. It was originally designed for millable urethanes and fluorocarbons, HNBR and other peroxide cured rubber compounds. It has been used to provide a unique surface finish and supple feel to vulcanized rubber goods. Even though it is vulcanized, it has the ability to flow under mechanical pressure, and therefore, it is useful in thermoplastic compounding. While the mechanism to minimize oil bleeding provided by VVO is not known, without being limited to a particular theory, it is believed that, as reported by its manufacturer, the ability of VVO to absorb large amounts of mineral oil and other liquid plasticizer provides the resistance to oil bleeding needed in the TPEs of the present invention. The capacity to absorb oil reduces the migration of oils and plasticizers to the surface of plastic parts. The absorption of ESO by VVO, however, does not adversely affect the hardness of the COPE-ESO-VVO TPE. That is unexpected.

Optional Additives

The thermoplastic elastomer compounds of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as Plastics Additives Database (2004) from Plastics Design Library (williamandrew.com), can select from many different types of additives for inclusion into the compounds of the present invention.

Non-limiting examples of optional additives include adhesion promoters; antioxidants; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; lubricants; micas; pigments, colorants and dyes; plasticizers; processing aids; other polymers; release agents; silanes, titanates and zirconates; slip and anti-blocking agents; stabilizers; stearates; ultraviolet light absorbers; viscosity regulators; waxes; and combinations of them.

Table 1 shows the acceptable, desirable, and preferable ranges of ingredients for the thermoplastic elastomer compound of the present invention.

TABLE 1

| Ingredient (Wt. Percent) | Ranges of Ingredients | | |
| --- | --- | --- | --- |
|  | Acceptable | Desirable | Preferable |
| Copolyester | 10-80% | 20-70% | 30-60% |
| Epoxidized Soybean Oil | 5-40% | 10-35% | 15-25% |
| Vulcanized Vegetable Oil | 10-60% | 15-55% | 20-40% |
| Other Additives | 0-30% | 0-15% | 0-5% |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 300 to about 700 revolutions per minute (rpm), and preferably from about 500 rpm. Typically, the output from the extruder is pelletized for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (williamandrew.com), one can make articles of any conceivable shape and appearance using compounds of the present invention.

USEFULNESS OF THE INVENTION

Any plastic article currently made from a conventional TPE compound made using fossil-fuel derived polymers and other ingredients can now be made using a sustainable biorenewable TPE of the present invention.

In any regulatory or market regime which demands predominantly biorenewable content, the TPE compounds of the present invention can serve in an unexpectedly superior fashion with biorenewable content exceeding 50% without (a) loss of desired Shore A hardness, (b) loss of other physical properties necessary for a TPE and (c) unacceptable bleeding of ESO from the plastic article, whether extruded or molded.

As sources of fossil-fuel polymers become more expensive or scarce or less desired for reasons of sustainability, the biorenewable compound of the present invention can become the best option for makers of plastic articles and their customers.

EXAMPLES

Table 2 shows sources of ingredients for the examples. It must be noted that no attempt was made to combine only COPE with VVO because the solid powder VVO would not reduce the Shore A Hardness of the COPE. It must also be noted that no physical properties were measured for Comparative Examples A-D because the ESO was bleeding severely from the extruded pellets resulting from the compounding process.

All ingredients for each Example and each Comparison Example were fed into the throat of a Leistritz twin screw extruder having a mixing speed of 500 rpm and a temperature of 182° C. in Zone 1, 193° C. in Zone 2, 204° C. in Zone 3, 204° C. in Zone 4, 204° C. in Zone 5, 204° C. in Zone 6, 204° C. in Zone 7, 204° C. in Zone 8, and 193° C. Die. After compounding, pellets were formed and molded into 5"×6"×0.125" (12.7 cm×15.24 cm×0.32 cm) plaques for Shore A Hardness and other physical performance testing.

Table 2 shows the formulations, test methods employed and the results obtained.

TABLE 2

| | 1 | A | 2 | B | 3 | C | 4 | D |
|---|---|---|---|---|---|---|---|---|
| Ingredients (Weight Percent) | | | | | | | | |
| Akrofax 758 Vulcanized Vegetable Oil (Akrochem, Akron, OH) | 45.24 | 0.00 | 41.49 | 0.00 | 34.96 | 0.00 | 29.32 | 0.00 |
| Paraplex G-62 Epoxidized Soybean Oil (Hallstar, Chicago, IL) | 24.88 | 45.44 | 20.74 | 35.45 | 15.73 | 24.19 | 11.73 | 16.59 |
| Irganox 1010 antioxidant (Ciba, Terrytown, NY) | 0.11 | 0.21 | 0.10 | 0.18 | 0.09 | 0.13 | 0.07 | 0.10 |
| Kemamide E Ecrucamide lubricant (PMC Group, Mount Laurel, NJ) | 0.36 | 0.66 | 0.33 | 0.57 | 0.28 | 0.43 | 0.23 | 0.33 |
| Hytrel RS40F3 (DuPont, Wilmington, DE) | 29.41 | 53.70 | 37.34 | 63.81 | 48.94 | 75.25 | 58.64 | 82.97 |
| Total | 100.00 | 100.00 | 100.00 | 100.00 | 100.00 | 100.00 | 100.00 | 100.00 |
| Bio Renewable Content | 69% | 68% | 67% | 64% | 63% | 60% | 61% | 57% |
| Form of Product After Mixing | Pellets | Pellets Bleeding Oil | Pellets | Pellets Bleeding Oil | Pellets | Pellets Bleeding Oil | Pellets | Pellets Bleeding Oil |
| Test Results | | | | | | | | |
| Hardness Shore A Scale (ASTM ASTM D2240, 10 s delay) | 42 | Not Possible | 52 | Not Possible | 63 | Not Possible | 70 | Not Possible |
| 100% Modulus (ASTM ASTM D412, Die C) | 183 | Not Possible | 233 | Not Possible | 338 | Not Possible | 424 | Not Possible |
| Tensile Strength (ASTM ASTM D412, Die C) | 331 | Not Possible | 512 | Not Possible | 859 | Not Possible | 1127 | Not Possible |
| Tensile Elongation (ASTM ASTM D412, Die C) | 223 | Not Possible | 288 | Not Possible | 406 | Not Possible | 536 | Not Possible |
| Viscosity at 67023/s (ASTM D3835, 200° C.) | 4.3 | Not Possible | 5.2 | Not Possible | 6.5 | Not Possible | 8 | Not Possible |
| Viscosity at 11170/s (ASTM D3835, 200° C.) | 15.5 | Not Possible | 19 | Not Possible | 23.8 | Not Possible | 29.8 | Not Possible |
| Viscosity at 1340.5/s (ASTM D3835, 200° C.) | 60.5 | Not Possible | 72.5 | Not Possible | 90.1 | Not Possible | 115 | Not Possible |
| Viscosity at 223/s (ASTM D3835, 200° C.) | 153 | Not Possible | 189 | Not Possible | 221 | Not Possible | 291 | Not Possible |
| Viscosity at 67.023/s (ASTM D3835, 200° C.) | 288 | Not Possible | 346 | Not Possible | 399 | Not Possible | 550 | Not Possible |
| Overmolding to PC/ABS (90° Peel Strength, lbs/linear inch PLI ASTM D-413) | 10 | Not Possible | 14 | Not Possible | 20 | Not Possible | 28 | Not Possible |

Examples 1-4 demonstrate a Shore A hardness ranging from 42 to 70 with a biorenewable content ranging from 61 to 69 percent. The presence of the VVO in the biorenewable TPE in Examples 1-4 made it possible to avoid bleeding of ESO from the pellets and the molded testing samples.

It was unexpected to be able to plasticize the biorenewable TPE to commercially acceptable Shore A hardness levels without bleeding of ESO from the TPE, because of the presence of VVO to stabilize the TPE. The amount of VVO, even in excess of the amount of ESO at a weight ratio of 2.50:1.0, did not adversely affect Shore A hardness.

The invention is not limited to the above embodiments. The claims follow.

What is claimed is:

1. A thermoplastic elastomer compound, comprising:
   (a) from about 10 to about 80 weight percent of a copolyester elastomer that is a segmented copolymer;
   (b) from about 5 to about 40 weight percent of epoxidized soybean oil; and
   (c) from about 10 to about 60 weight percent of a vulcanized vegetable oil;
   wherein the biorenewable content of the compound is at least about 50 weight percent; wherein the compound has a Shore A hardness ranging from about 40 to about 80; and wherein the compound does not bleed epoxidized soybean soil.

2. The compound of claim 1, wherein the compound comprises from about 20 to about 70 weight percent of the copolyester elastomer, from about 10 to about 35 weight percent of the epoxidized soybean oil, and from 15 to about 55 weight percent of the vulcanized vegetable oil.

3. The compound of claim 1, wherein the compound comprises from about 30 to about 60 weight percent of the copolyester elastomer, from about 15 to about 25 weight percent of the epoxidized soybean oil, and from 20 to about 40 weight percent of the vulcanized vegetable oil.

4. The compound of claim 1, wherein the biorenewable content of the compound is at least about 55%.

5. The compound of claim 1, wherein the biorenewable content of the compound is at least about 60%.

6. The compound of claim 1, comprising greater than 0% and not more than 30% optional additives.

7. The compound of claim 4, comprising greater than 0% and not more than 30% optional additives.

8. The compound of claim 5, comprising greater than 0% and not more than 30% optional additives.

9. A plastic article made from a compound of claim 1.

10. The article of claim 9, wherein the biorenewable content of the compound is at least about 55%.

11. The article of claim 9, wherein the biorenewable content of the compound is at least about 60%.

12. The compound of claim 1, wherein the compound is in a form of a pellet.

* * * * *